(12) United States Patent
Shah et al.

(10) Patent No.: US 11,533,309 B2
(45) Date of Patent: Dec. 20, 2022

(54) DIGITAL SIGNATURE INJECTION FOR USER AUTHENTICATION ACROSS MULTIPLE INDEPENDENT SYSTEMS

(71) Applicant: Okta, Inc., San Francisco, CA (US)

(72) Inventors: Umang Shah, Fremont, CA (US); Johannes Stockmann, Woodinville, WA (US); Santosh Reddy Male, San Francisco, CA (US); Ildar Abdullin, Dublin, CA (US)

(73) Assignee: Okta, Inc., San Francisco, CA (US)

( * ) Notice: Subject to any disclaimer, the term of this patent is extended or adjusted under 35 U.S.C. 154(b) by 22 days.

(21) Appl. No.: 17/134,540

(22) Filed: Dec. 28, 2020

(65) Prior Publication Data

US 2022/0210156 A1 Jun. 30, 2022

(51) Int. Cl.
*H04L 9/40* (2022.01)
(52) U.S. Cl.
CPC ...... *H04L 63/0884* (2013.01); *H04L 63/0442* (2013.01); *H04L 63/061* (2013.01); *H04L 63/0815* (2013.01)
(58) Field of Classification Search
CPC ............. H04L 63/0884; H04L 63/0442; H04L 63/061; H04L 63/0815
See application file for complete search history.

(56) References Cited

U.S. PATENT DOCUMENTS

| | | | |
|---|---|---|---|
| 2012/0023568 A1* | 1/2012 | Cha | H04L 63/0807 726/10 |
| 2016/0094531 A1* | 3/2016 | Unnikrishnan | H04L 63/08 726/7 |
| 2018/0123804 A1* | 5/2018 | Smith | H04L 63/0869 |
| 2019/0245848 A1* | 8/2019 | Divoux | H04L 63/0815 |
| 2019/0312720 A1* | 10/2019 | Liu | H04L 9/0861 |

\* cited by examiner

*Primary Examiner* — Techane Gergiso
(74) *Attorney, Agent, or Firm* — Fenwick & West LLP

(57) ABSTRACT

A process running on client devices intercepts requests destined for an identity provider ("IdP") system and injects a digital signature corresponding to a user associated with the request. In order to reduce or eliminate the burden on providers of the applications or other resources used by the users, the organization providing the IdP system may also provide components that run locally on the client devices of users and integrate with the users' applications. For example, in one embodiment code of the IdP system is run within a container of an application to handle communication with the IdP system. Additionally, code of the IdP system is run as a local process that handles request interception and digital signature injection. For client devices not supporting the use of the local process, a separate verifier application of the IdP can be run locally and allow interactively performing authentication via a user interface.

12 Claims, 3 Drawing Sheets

DIGITAL SIGNATURE INJECTION FOR USER AUTHENTICATION ACROSS MULTIPLE INDEPENDENT SYSTEMS

FIELD OF ART

The present invention generally relates to the field of software systems, and more specifically, to facilitating user authentication for applications or other resources provided by a number of different entities.

BACKGROUND

Users of computer systems typically have multiple accounts with different independent systems, such as various third-party applications and/or websites, with different credentials (e.g., username and password or other factors) for each. The need of users to authenticate their identities separately for each of their separate accounts in order to access their resources on those accounts requires significant effort and reduces the productivity of those users due to the need to remember authentication credentials and enter those credentials for each of their accounts. This difficulty may further lead to security risks if users attempt to mitigate the difficulty through ill-advised practices such as password reuse, listing passwords in insecure locations, or the like.

Such users could benefit greatly from the ability to use federated identities linking their identities across their various accounts, and from applications thereof such as single sign-on (SSO) to automatically log them into their different accounts. However, providing federated identities in a secure manner is a technically complex problem beyond the capabilities of most organizations. To address these difficulties, users may entrust a separate identity provider ("IdP") system with their credentials for authenticating themselves on their various third-party accounts on different systems, and the IdP system may facilitate the authentication of the user across the various accounts and systems using those credentials. However, it is important that the various third-party systems not need to expend effort in order to integrate themselves with the IdP system, or adoption of the IdP-based system will be slow and costly. It is additionally important that the authentication mechanism be able to be very secure, such as when a user wishes to use multifactor authentication (MFA) to provide additional account security.

SUMMARY

A process running on a client device intercepts a request destined for an identity provider ("IdP") system and injects a digital signature corresponding to a user associated with the request. The digital signature serves to reliably identify the user to the IdP system.

In order to reduce or eliminate the burden on providers of the applications or other resources used by the users, the organization providing the IdP system may also provide components that run locally on the client devices of users and integrate with the users' applications. For example, in one embodiment a container (such as a WebView) is used in local native applications of the users and code of the IdP system is run within the container to handle communication with the IdP system. Additionally, code of the IdP system is run as a local process (e.g., a proxy server process) that handles request interception and digital signature injection. For client devices not supporting the use of the local process (e.g., where the operating system does not natively support proxy servers), a separate security application of the IdP can be run locally and allow interactively performing authentication via a user interface.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
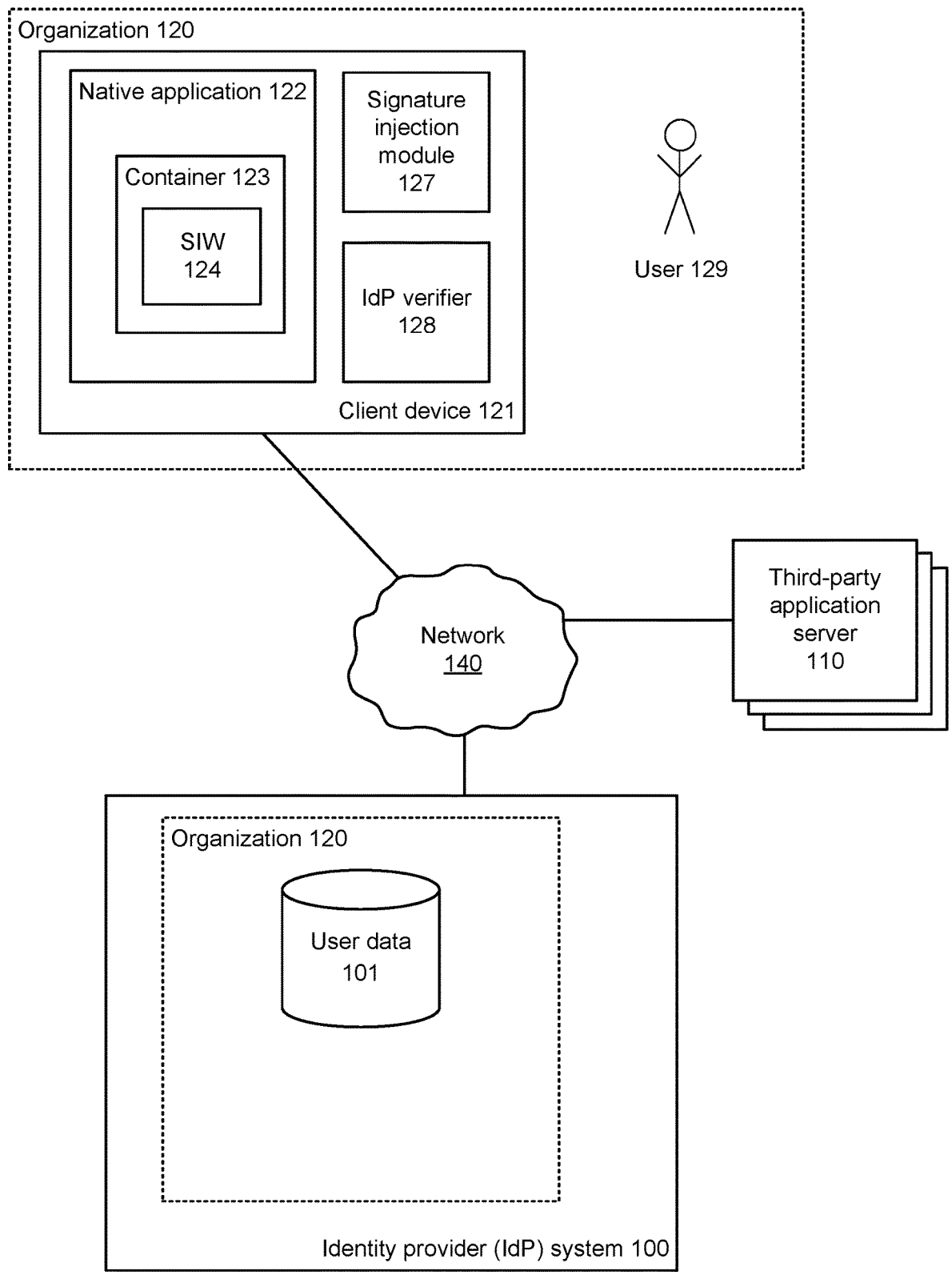
FIG. 1 illustrates one embodiment of a computing environment in which users use a client computing device to accomplish tasks on multiple different accounts.

FIG. 1 illustrates one embodiment of a computing environment in which users use a client computing device to accomplish tasks on multiple different accounts. The users may be affiliated with an organization (e.g., employees or volunteers of the organization) and may accomplish the tasks on behalf of the organization. The users may have multiple accounts on different systems, and the systems may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.), databases, files systems, or the like. Such applications 110 could be, for example, entirely web-based and accessible through a web browser, or could be accessible through a native application installed on the user's client device and communicating with a remote application server. Since each application or other resource could be from a different provider—each of which could have a different identity for a user—a single user will typically have many different identities and associated credentials corresponding to the different resources that the user uses. FIG. 1 illustrates one such possible resource: an application partially or entirely implemented via a third-party application server 110. An identity provider (IdP) system provides users with a federated identity integrating the users' different identities on different accounts, thereby providing more convenient, efficient, and secure access to the different accounts. These entities are now described in more detail.

The organization 120 is an entity, such as a business, a school, a governmental agency, or the like, that has a number of affiliated users 129, such as employees or volunteers. The organization also has one or more client devices 121 that the users 129 use to perform tasks on behalf of the organization. In other embodiments, the users are not affiliated with an organization, but instead act independently using client devices 121 belonging to them.

The identity provider system (IdP system) 100 provides the user 129 with a federated identity linking the various identities of the user on the different accounts (e.g., the third-party applications 110) or other resources to which the user has access. The IdP system 100 stores user data 101 that include a set of identities of known users with accounts on the IdP system 100. The user data 101 may include a form of identity on the IdP system 100 such as a username, as well as other credential data associated with a user, such as a user password or information derived therefrom. The user data 101 may also include many other types of data about users, such as the factor types and providers that they may use when seeking identity verification from the IdP system 100, their role(s) or group(s) within the organization 120 to which they belong (e.g., "Engineering", "Legal", "Manager 2", "Director", or the like), and/or the resources to which they have access (e.g., third-party applications 110 such as SALESFORCE, MICROSOFT OFFICE 365, SLACK, or the like), as some examples. The user data 101 may also include identities and credentials of the various users on the various accounts to which they have access, thereby linking a user's identity on the IdP system 100 to the user's identities on those different accounts and (by extension) permitting access to those accounts. In some embodiments, the IdP system 100 is part of the organization 120, rather than being an independent entity as it is in other embodiments.

Software on the client device 121 facilitates providing users with federated identities by securely and transparently communicating with the IdP system 100 that handles the details of identity federation and provides related identity services. In this way, the users of the organization 120 simply and securely obtain access to the various third-party accounts or other resources that they need to complete tasks on behalf of the organization. The software on the client device 121 that communicates with the IdP system may (although need not) be provided by the entity responsible for the IdP system 100.

In some embodiments, the IdP system 100 includes single sign-on (SSO) functionality that allows the IdP system to transparently log a user in to the different accounts or other resources to which the user has access. For example, for a given user who has logged in to the IdP system 100, the IdP system can look up the user's accounts or other resources within the user data 101, as well as the user's credentials for those accounts. Using the credentials, as well as metadata or other information about the accounts, IdP system 100 can automatically log the user into the applications or other resources described in the user data 101, such as by establishing application sessions with the various applications and providing corresponding session data (e.g., session tokens) to the device 121. Thus, with a single login to the IdP system 100, the SSO functionality of the IdP system provides a user with automatic access to all the user's accounts or other resources.

In some embodiments, a client device 121 includes a number of components that a user 129 can use to accomplish tasks via applications or other resources, or that interface with the IdP system 100 in order to provide federated identities, SSO functionality, and/or other functionality. These components are now described in more detail.

The client device 121 may include a native application 122, which is a locally-installed application that communicates with a third-party application server 110 to provide application functionality, such as an email application, a chat application, an accounting application, or the like. For example, the native application 122 may provide the user interface for the application and communicate with its corresponding third-party application server 110 to access the user's data to display within the user interface. Alternatively, a given application may not be installed locally on the client device 121, but rather may be downloaded and executed entirely within a web browser on the client device 121, for example. (The terms "application 110", "application 122", or simply "application" are sometimes used interchangeably herein to general denote functionality of the application, whether it is implemented entirely on the application server 110, or partially on the application server 110 and partially via the native application 122.)

An application executing on the client device 121 (whether the application is a native application 122 or a fully web-based application) can include a container 123 that hosts code provided to it. For example, in one embodiment the container 123 is implemented as an embeddable browser, such as a WebView that runs scripting code (e.g., JavaScript™ code) within a native application 122. For example, in some embodiments the container 123 obtains a sign-in widget 124, which is code that handles details of communication with the IdP system 100 on behalf of the application 122. In some embodiments, the application executing on the client device 121 makes direct calls to an API of the IdP system 100 to perform authentication, and these calls may in turn be intercepted and managed by the IdP verifier component 128.

The client device 121 also includes a signature injection module 127 that transparently injects digital signatures into requests sent to the IdP system 100, thereby freeing the application 122 from needing to support signature functionality. In some embodiments, the signature injection module 127 is implemented as a proxy server process. For example, operating systems such as iOS™ directly support proxy servers, in which case the signature injection module 127 can be executed directly by the operating system. The signature injection module 127 intercepts messages sent to the IdP system 100 and adds a user-specific digital signature to the request, thereby ensuring that the request is indeed coming from a client device 121 of the user 129. The signature injection module 127 may register to request interception by (for example) registering with the operating system to be notified of requests sent to a particular URL, such as a particular URL specifying a domain name of the IdP system 100.

The signatures for the user are created using encryption keys corresponding to the user. For example, in one embodiment, during a prior enrollment phase the user is enrolled on the client device 121 so as to be permitted to communicate with the IdP 100. During this enrollment, a <public, private> keypair is generated and stored securely on the client device 121, such as by secure enclave hardware isolated from the operating system kernel, and the public key is also provided to the IdP system 100 and stored in the user data 101 in association with the user and the client device. The private key may then be later used to generate a signature, and the public key to verify the signature. In some embodiments, the signatures are injected into a request by generating a JSON Web Token (JWT) using a cryptographic key (e.g., the private key) and adding the JWT within the header or body of the request. In some embodiments, what is signed is the a payload that contains any device signals used in authenticating the request, as well as a transaction ID. The IdP system 100 can later verify that the signature was generated for the user on the client device 121 by using the digital keys (e.g., the public key) stored in association with the user and device within the user data 101.

The client device 121 may also include an IdP verifier component 128. The IdP verifier component 128 is an application that interacts with the user 129 to authenticate the user with the IdP 100. For example, in some embodiments the IdP verifier component 128 has a graphical user interface that the user uses to specify data used to authenticate the user to the IdP system 100. For instance, the IdP verifier component 128 could display text fields or other data entry areas for specifying a username and password of the user 129, a drop-down list or other menu of types of MFA factors to use for authentication (e.g., biometrics, physical tokens, or push notifications), or the like. Based on the data and/or selections specified by the user 129 in the user interface, the IdP verifier component 128 communicates with the IdP system 100 to authenticate the user on the IdP system 100.

Physically, the organization 120 is made up of a number of computing systems, including the various client devices 121; one or more internal networks that connects the computing systems, including routers or other networking devices that define the boundary between the organization and external networks; and the like.

Similarly, the IdP system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
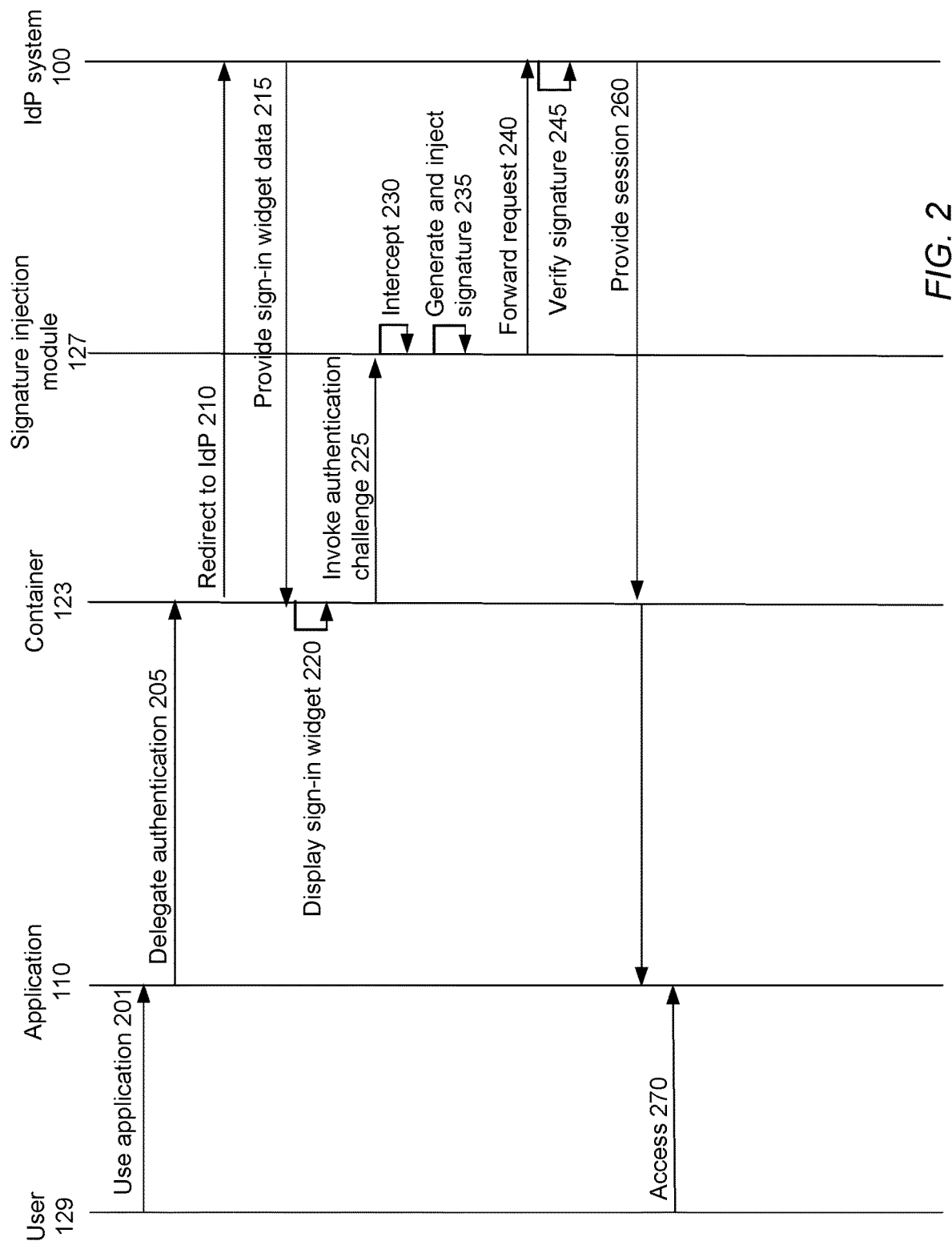
FIG. 2 illustrates interactions between a user, application or other resource, and identity provider system when authenticating a user, according to some embodiments.

FIG. 2 illustrates interactions between a user 129, application 110/122 or other resource, and IdP system 100 when authenticating a user, according to some embodiments.

FIG. 2 begins with a user 129 using 201 an application 110 (and or a local native version 122 thereof) for which the user does not already have an active session established. In order to authenticate to the IdP system 100 so as to use federated identity functionality for in turn authenticating with the application 110, the application delegates 205 authentication to the code within the container 123. For example, in some embodiments the application loads a URL—such as a URL of the IdP system 100—within the container 123, and when the code on the page associated with that URL completes execution, the application 110 waits for a specific redirect from the IdP system 100 to indicate that the authentication process has completed.

The container 123 redirects 210 the application's authentication request to the IdP system 100, e.g., in response to an HTTP redirect from the IdP system. The IdP system 100 obtains the redirected authentication request and in response provides 215 code for the sign-in widget 124. The sign-in widget is rendered as a graphical user interface component of the application 110 (e.g., as a "Sign in to application" link). (If the container 123 of the application 110 already has obtained the sign-in widget 124, then steps 210 and 215 can be skipped.) When the user uses the sign-in widget 124 (e.g., by clicking its graphical representation), the code for the sign-in widget 124 then runs to invoke 225 an authentication challenge by sending an authentication request to the IdP system 100.

The signature injection module 127 intercepts 230 the authentication request, e.g., as a result of having registered with the operating system to listen for a request being sent to a URL corresponding to the IdP system 100. In response, the signature injection module 127 generates 235 a signature (e.g., a JWT signature) and injects the signature into the authentication request, as described above with respect to FIG. 1. The signature injection module 127 forwards 240 the authentication request (including the injected signature) to the IdP system 100. The IdP system verifies 245 the injected signature by consulting the user data 101 to find the digital key associated with the user 129 and the client device 121 and using the digital key to verify the signature, as described above with respect to FIG. 1.

If the verification 245 is successful, the IdP system 100 provides 260 session information back to the container 123 of the application. In some embodiments, the IdP system 100 obtains the session information from the application server 110 by reading the credentials of the user 129 for the application 110 from the user data 101 and sending the credentials to the application server as part of a request to authenticate the user and begin a session, and receiving the session information as part of the response from the application server.

The user 129 can then access 270 the functionality of the application 122/110, given that the application session has been established and the client device 121 has obtained the session information for the application session.

Returning to steps 225 and 230, for client devices 121 for which a signature injection module 127 is not available (e.g., because its operating system does not support proxy server processes), step 230 cannot be performed by the signature injection module. Accordingly, the IdP system 100 obtains the authentication challenges sent at step 225. Because a digital signature was not added by a signature injection module 127, the IdP system 100 cannot rely on the digital signature to reliably establish user identity. Thus, the IdP system 100 instead generates a link or other user interface element and associated code that it provides to the application 122, and that is displayed by the container 123. The link, when selected, transfers control to the IdP verifier component 128. The IdP verifier component 128 accordingly handles authentication of the user based on explicit interactions of the user with the IdP verifier component, such as the user using a user interface of the IdP verifier component to enter the user's credentials, to select one or more types of factors to use for MFA, or the like. The IdP verifier component 128 can additionally accept session information from the IdP system 100 after the IdP system 100 establishes sessions with the various applications 110 on which the user 129 has accounts, which allows the user 129 to subsequently access the functionality of the applications, as at step 270. However, since such a method requires user interaction, it lacks the transparent nature of the signature injection technique, which is less convenient for the user.

Figure 3:
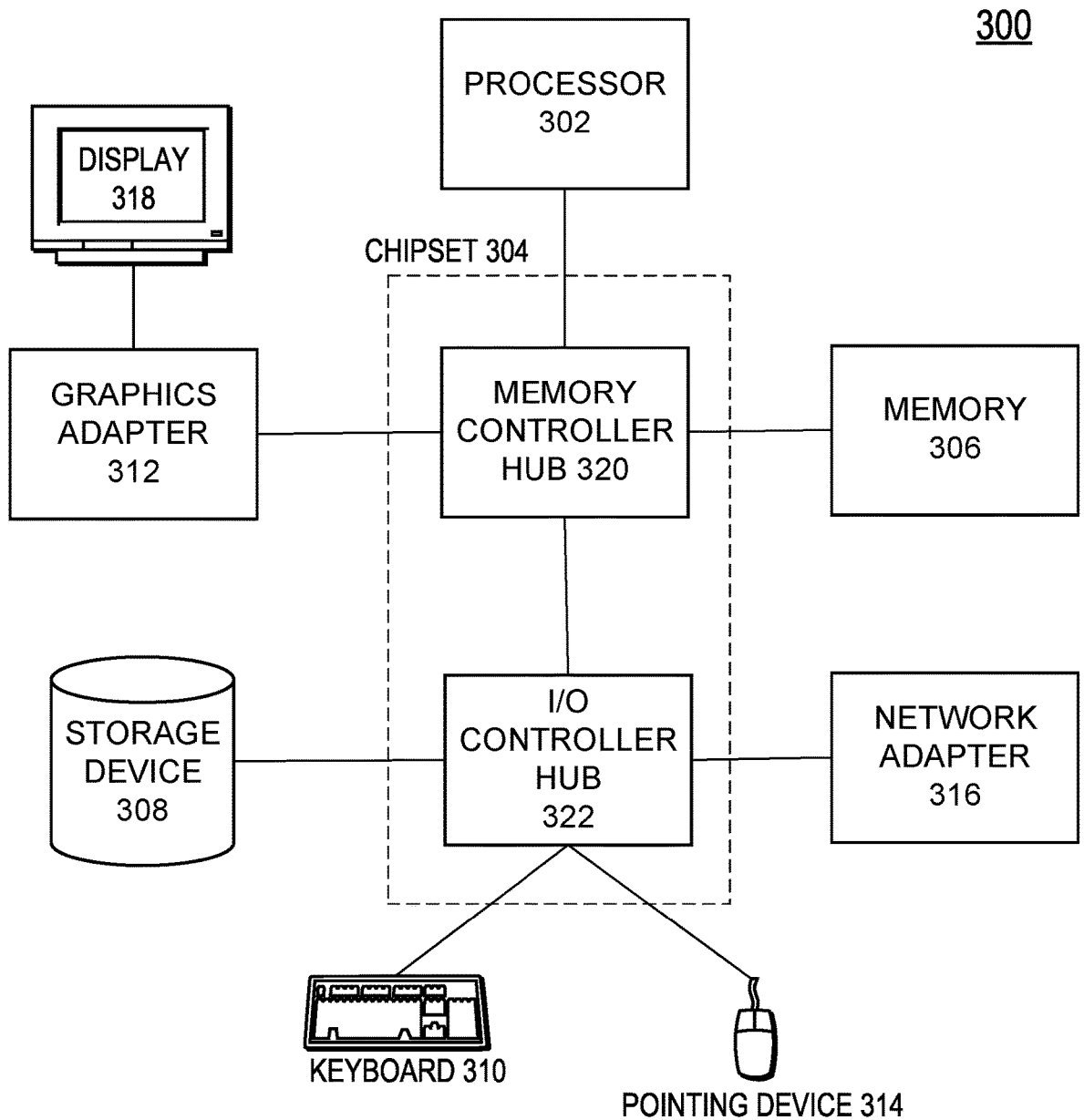
FIG. 3 is a high-level block diagram illustrating physical components of a computer used as part or all of (for example) the identity provider, the client device, and/or the third-party application server of FIG. 1, according to one embodiment.

FIG. 3 is a high-level block diagram illustrating physical components of a computer 300 used as part or all of (for example) the identity provider 100, the client device 121, and/or the third-party application server 110, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard 310 or pointing device 314. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for providing federated identity services for a client device of a user, the computer-implemented method comprising:
    enrolling the user on the client device, the enrollment comprising:

generating a public key and a private key for the user; and registering the public key with a remote identity provider (IdP) system in association with the user and the client device;

receiving, at the client device, an indication of an access of the user to a third-party application;

sending, by the client device, an authentication challenge request to the IdP system;

intercepting, by a proxy server signature injection module executing on the client device, the authentication challenge request;

generating, by the proxy server signature injection module, using the private key for the user, a signature corresponding to the user;

injecting, by the proxy server signature injection module, the signature into the authentication challenge request;

forwarding, by the proxy server signature injection module, the authentication challenge request with the injected signature to the IdP system, wherein the IdP system authenticates the user, based at least in part on the injected signature and the registered public key for the user, in response to the forwarded authentication challenge request.

2. The computer-implemented method of claim 1, further comprising:

executing scripting code within a container of the application to redirect an authentication request to the IdP system; and responsive to the redirecting, obtaining a sign-in widget from the IdP system.

3. The computer-implemented method of claim 2, further comprising:

displaying the sign-in widget; and receiving a user selection of the sign-in widget;

wherein the sign-in widget sends the authentication challenge request to the IdP system responsive to the user selection of the sign-in widget.

4. The computer-implemented method of claim 1, further comprising:

receiving, from the IdP system, session information for a session of the user with the third-party application; and sending the received session information to a third-party application server of the third-party application along with a request to perform an action for the user within the third-party application.

5. A non-transitory computer-readable storage medium storing instructions for providing federated identity services for a client device of a user, the instructions when executed by a computer processor performing actions comprising:

enrolling the user on the client device, the enrollment comprising:

generating a public key and a private key for the user; and registering the public key with a remote identity provider (IdP) system in association with the user and the client device;

sending, by the client device responsive to the user accessing a third-party application, an authentication challenge request to the IdP system;

intercepting, by a proxy server signature injection module executing on the client device, the authentication challenge request;

generating, by the proxy server signature injection module, using the private key for the user, a signature corresponding to the user;

injecting, by the proxy server signature injection module, the signature into the authentication challenge request;

forwarding, by the proxy server signature injection module, the authentication challenge request with the injected signature to the IdP system, wherein the IdP system authenticates the user, based at least in part on the injected signature and the registered public key for the user, in response to the forwarded authentication challenge request.

6. The non-transitory computer-readable storage medium of claim 5, the actions further comprising:

executing scripting code within a container of the application to redirect an authentication request to the IdP system; and responsive to the redirecting, obtaining a sign-in widget from the IdP system.

7. The non-transitory computer-readable storage medium of claim 6, the actions further comprising:

displaying the sign-in widget; and receiving a user selection of the sign-in widget;

wherein the sign-in widget sends the authentication challenge request to the IdP system responsive to the user selection of the sign-in widget.

8. The non-transitory computer-readable storage medium of claim 5, the actions further comprising:

receiving, from the IdP system, session information for a session of the user with the third-party application; and sending the received session information to a third-party application server of the third-party application along with a request to perform an action for the user within the third-party application.

9. A computer system providing federated identity services for a client device of a user, the computer system comprising:

a computer processor; and a non-transitory computer-readable storage medium storing instructions user, the instructions when executed by the computer processor performing actions comprising:

enrolling the user on the client device, the enrollment comprising:

generating a public key and a private key for the user; and registering the public key with a remote identity provider (IdP) system in association with the user and the client device;

sending, by the client device responsive to the user accessing a third-party application, an authentication challenge request to the IdP system;

intercepting, by a proxy server signature injection module executing on the client device, the authentication challenge request;

generating, by the proxy server signature injection module, using the private key for the user, a signature corresponding to the user;

injecting, by the proxy server signature injection module, the signature into the authentication challenge request;

forwarding, by the proxy server signature injection module, the authentication challenge request with the injected signature to the IdP system, wherein the IdP system authenticates the user, based at least in part on the injected signature and the registered public key for the user, in response to the forwarded authentication challenge request.

10. The computer system of claim 9, the actions further comprising:

executing scripting code within a container of the application to redirect an authentication request to the IdP system; and responsive to the redirecting, obtaining a sign-in widget from the IdP system.

11. The computer system of claim 10, the actions further comprising, further comprising:

displaying the sign-in widget; and receiving a user selection of the sign-in widget;

wherein the sign-in widget sends the authentication challenge request to the IdP system responsive to the user selection of the sign-in widget.

12. The computer system of claim 9, the actions further comprising:

receiving, from the IdP system, session information for a session of the user with the third-party application; and sending the received session information to a third-party application server of the third-party application along with a request to perform an action for the user within the third-party application.

* * * * *